United States Patent [19]

Pierce

[11] Patent Number: 5,250,011

[45] Date of Patent: Oct. 5, 1993

[54] MULTIPLE SPEED SYNCHRONOUS AUTOMATIC TRANSMISSION FOR MOTOR VEHICLES

[75] Inventor: Stanley L. Pierce, Northville, Mich.

[73] Assignee: Ford Motor Company, Dearborn, Mich.

[21] Appl. No.: 878,353

[22] Filed: May 4, 1992

[51] Int. Cl.⁵ .......................... F16H 57/10; F16H 1/32
[52] U.S. Cl. ..................................... 475/276; 475/277; 475/279
[58] Field of Search ........................ 475/276, 277, 279

[56] References Cited

U.S. PATENT DOCUMENTS

| | | | |
|---|---|---|---|
| 3,054,488 | 9/1962 | General et al. | 192/44 |
| 3,503,282 | 3/1970 | Peterson | 475/276 |
| 3,835,732 | 9/1974 | Mori et al. | 475/276 |
| 4,368,649 | 1/1983 | Vahratian et al. | 475/66 |
| 4,509,389 | 4/1985 | Vahratian et al. | 475/66 |
| 4,660,439 | 4/1987 | Hiraiwa | 475/276 |
| 4,963,124 | 10/1990 | Takahashi et al. | 475/277 X |
| 5,069,656 | 12/1991 | Sherman | 475/276 |
| 5,099,718 | 3/1992 | Asada et al. | 475/276 X |

FOREIGN PATENT DOCUMENTS

| | | | |
|---|---|---|---|
| 2-248745 | 10/1990 | Japan | 475/277 |
| 2-275154 | 11/1990 | Japan | 475/277 |

OTHER PUBLICATIONS

U.S. Ser. No. 07/722,453 filed Jun. 27, 1991.
U.S. Ser. No. 07/862,929 filed Apr. 3, 1992.

Primary Examiner—Leslie A. Braun
Assistant Examiner—David E. Henn
Attorney, Agent, or Firm—Frank G. McKenzie; Roger L. May

[57] ABSTRACT

A multiple speed transmission for use in an automotive vehicle driveline includes a torque converter and three simple planetary gear units, one-way clutches and brakes, friction clutches, and friction brakes. The engaged and disengaged state of the friction elements permit the transmission to produce several underdrive speed ratios, a direct drive ratio and several overdrive ratios. The transmission output shaft is geared to produce a direct drive connection to the spindle of an axle differential, which drives wheels fixed to the axle shafts.

13 Claims, 3 Drawing Sheets

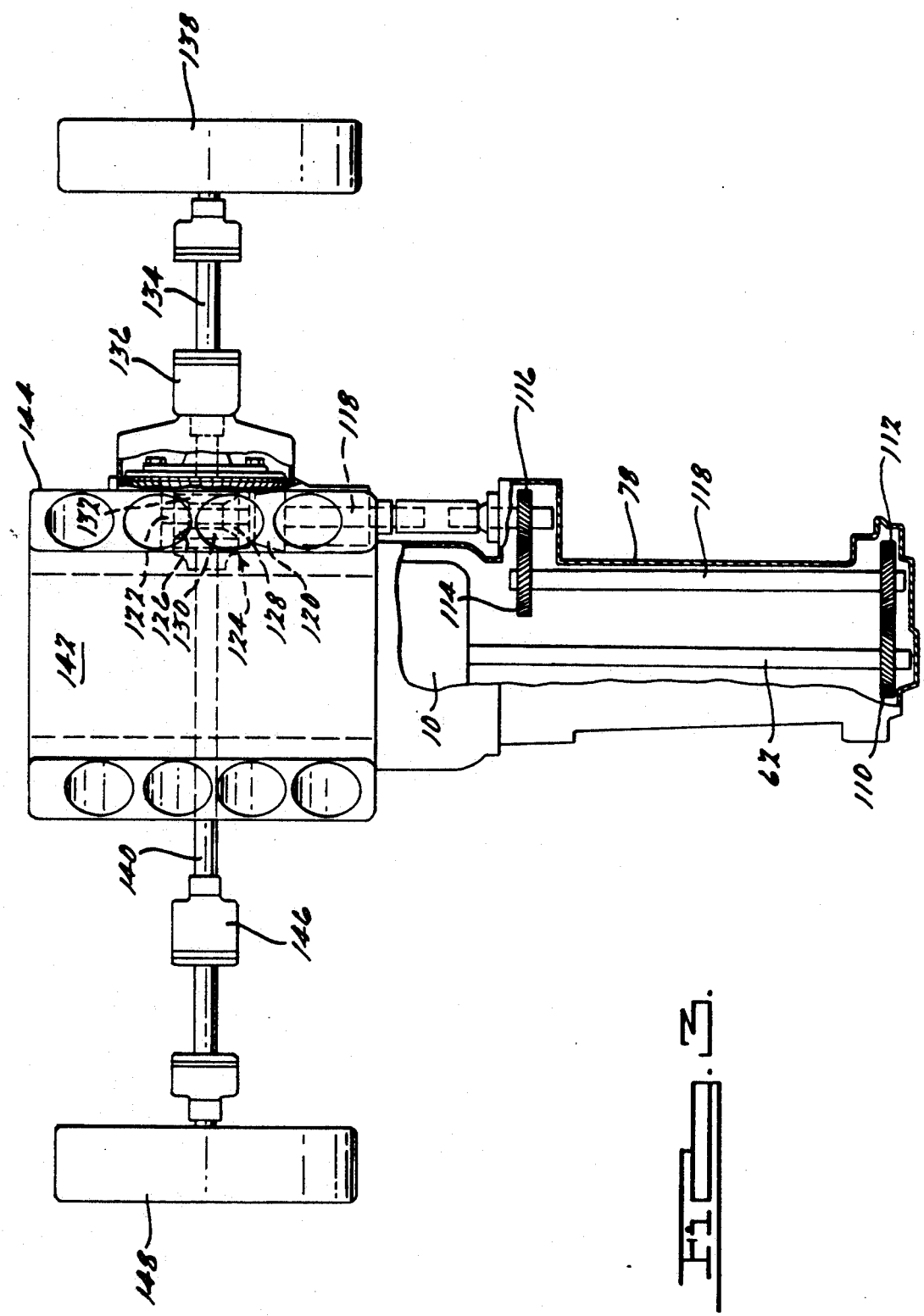

MULTIPLE SPEED SYNCHRONOUS AUTOMATIC TRANSMISSION FOR MOTOR VEHICLES

BACKGROUND OF THE INVENTION

1. Field of the Invention

This invention relates to planetary gearing, clutches and brakes of an automatic transmission for a motor vehicle. More particularly, the invention pertains to a technique for controlling operation of the clutches and brakes to produce multiple gear ratios.

2. Description of the Prior Art

This invention comprises improvements in a four speed ratio power transmission mechanism of the kind described in U.S. Pat. Nos. 4,509,389; 4,368,649, and U.S. Ser. No. 07/722,453 filed Jun. 27, 1991. These patents and application are assigned to the assignee of this invention.

U.S. Pat. No. 4,509,389 discloses a hydrokinetic torque converter located on the axis of the crankshaft of an internal combustion engine and two simple planetary gear units mounted for rotation about the axis of a driven shaft, which extends parallel to the crankshaft axis and concentrically through the gearing. The torque output element of the torque converter, which is the turbine shaft of the bladed turbine, is connected driveably to the gearing by to a drive sprocket and a chain. Clutches and brakes are used to establish and disestablish four forward driving ratios as well as a reverse drive ratio.

A first overrunning coupling and a first friction clutch are used to establish a driving connection between an input sun gear of the gearing and the driven sprocket. A second overrunning coupling and a second friction clutch located in series relationship connect the sun gear to the driven sprocket. The first friction clutch and the second friction clutch each are provided with fluid pressure operated servos that comprise an annular cylinder and a cooperating annular piston, which define pressure chambers that rotate about the axis of the gearing. When the chambers are pressurized, the pistons engage friction discs to establish a driving connection between the outer race of the companion overrunning coupling and the common rotary portions of the clutch cylinders.

U.S. Pat. No. 3,054,488 describes an overrunning coupling that is engaged and released selectively to accommodate free-wheeling in either direction and to prevent relative rotation between the coupling races in one direction. Rollers are urged into clutching engagement with inner and outer races or into a clutch release position by fluid pressure.

SUMMARY OF THE INVENTION

This invention, adds a fifth gear ratio to a four speed automatic transmission by adding an integrated third planetary gearset and the associated friction clutches and brakes, overrunning couplings and brake band.

The fifth speed ratio results by adding a simple planetary gear unit connecting the ring gear and sun gear of the added gear unit to elements of the other two planetary gear units. Specifically, the pinion carrier of the third gear unit is connected continually to the carrier of a second gear unit and to a brake drum that is held either by a brake band or by a one-way coupling. The brake drum is connected by parallel torque delivery paths to the sun gear of the third unit. The ring gear of the first gear unit is continually connected to the sun gear of the third gear unit.

The parallel torque paths connecting the brake band and sun gear include a coast clutch in one parallel leg and a series-connected one-way coupling and forward clutch, an hydraulically-satuated friction clutch, in the other parallel leg. The added speed range is a second overdrive range. Eight friction elements and four one-way couplings complete connections among the elements of the gearset to produce non-synchronous shift mechanics for all gear shifts.

This kinematic arrangement Provides gear ratio flexibility that allows close ratio spacing and a rotating carrier. In the fifth speed range, the rotating carrier provides centrifugal generated lubrication to the pinion bearings. Pinion speeds in the high gear range can approach 20,000 rpm; therefore, lubrication flow is necessary to assure reliability and long service life.

BRIEF DESCRIPTION OF THE DRAWINGS

FIG. 3 is a cross section of the drive line that includes the transmission of FIG. 1, an engine, differential mechanism and front axle shafts.

DESCRIPTION OF THE PREFERRED EMBODIMENT

Figure 1:
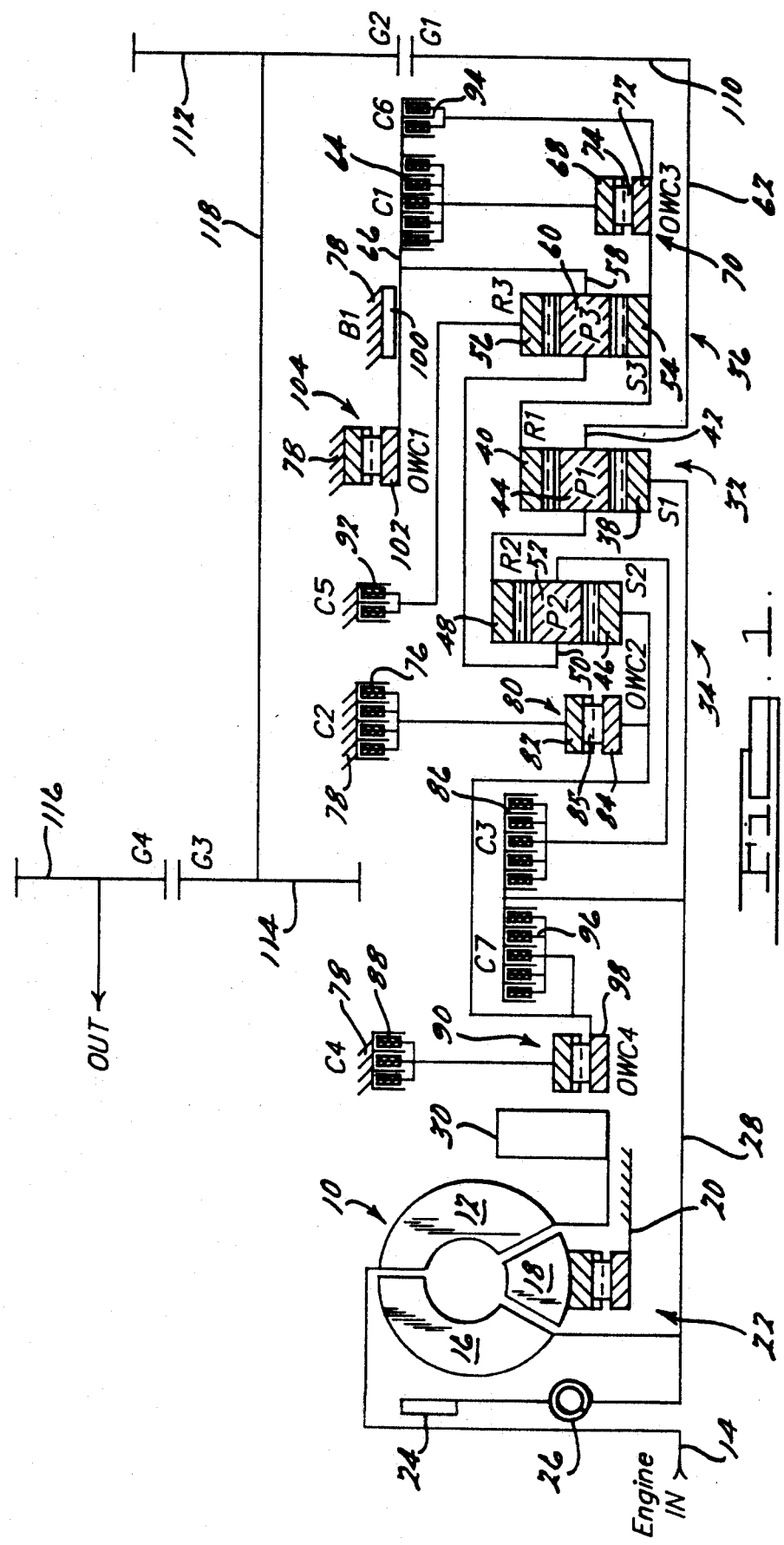
FIG. 1 in schematic form a gear, clutch and brake arrangement for a preferred embodiment of my invention.

Referring first to FIG. 1, a hydrokinetic torque converter 10 includes an impeller 12 connected to the crankshaft 14 of an internal combustion engine. A bladed turbine 16, a bladed stator 18 and the impeller define a toroidal fluid flow circuit, whereby the impeller is hydrokinetically connected to the turbine. The stator 18 is supported rotatably on a stationary stator sleeve shaft 20 and an overrunning brake 20 anchors the stator to the shaft 20 to prevent rotation of the stator in a direction opposite the direction of rotation of the impeller, although free-wheeling motion in the opposite direction is permitted.

The torque converter assembly includes a lockup clutch 24 located within the torque converter impeller housing. The torque output side of lockup clutch 24 includes a damper 26 located between the impeller and the turbine shaft, which is the transmission input shaft 28. When clutch 24 is engaged the turbine and impeller are hydrodynamically connected; when clutch 24 is disengaged, they are hydrokinetically connected. The damper absorbs transitory torque fluctuation associated with engagement of a lockup clutch. Fluid to the torque converter is supplied from the output of an oil pump assembly 30.

Planetary gearing includes first, second and third planetary gear units 32, 34, and 36. The first gear unit 32 includes a sun gear 38, ring gear 40, carrier 42 and planetary pinions 44, supported by carrier 30 in meshing engagement with sun gear 38 and ring gear 40. The second gear unit 34 includes a sun gear 46, a ring gear 48, carrier 50 and planetary pinions 52, rotatably supported on carrier 50 meshing engagement with sun gear 46 and ring gear 48. A third gear unit 36 includes a sun gear 54, a ring gear 56, carrier 58 and planetary pinions 60, rotatably supported on carrier 58 in meshing engagement with sun gear 54 and ring gear 46. Carrier 42 is driveably connected to ring gear 48, ring gear 40 is driveably connected to sun gear 54, and carrier 50 is driveably connected to carrier 58. A transmission output shaft 62 is driveably fixed to carrier 42, and the transmission input shaft 28 is continually driveably connected to sun gear 38.

Forward clutch (C1) 64 is a fluid-actuated, friction clutch whose engagement driveably connects drum 66 to the outer race 60 of one-way clutch 70, which produces a one-way drive connection between sun gear 54 and friction clutch 64. One-way clutch 70 includes an inner race 72 and set of rollers 74 located between the inner race and the outer race 68.

Intermediate brake (C2) 76 is a fluid-actuated brake whose engagement driveably connects the transmission casing through overrunning clutch 80 to sun gear 46. Coupling 80 includes an outer race 82 connected to the input side of brake 76, inner race 84 fixed to sun gear 46, and a set of rollers 85 located between the inner race 84 and outer race 82. Coupling 80 produces a one-way drive connection between sun gear 46 and brake 76.

Input shaft 28 can be driveably connected to planetary carrier 50 by engaging direct clutch (C3) 86, a fluid actuated friction element, for operation in the direct drive and overdrive speed ranges. Overdrive brake (C4) 88 selectively holds and releases sun gear 46 against rotation on the transmission casing 78 through overrunning coupling 90, which produces a one-way drive connection between sun gear 46 and the overdrive brake.

High brake (C5) 92, a fluid actuated friction element, is engaged and disengaged selectively to hold ring gear 56 against rotation on the transmission casing 78 and to release ring gear 56. Sun gear 54 and the inner race 72 of over-running coupling 70 are driveably connected by coast clutch (C6) 94 to brake drum 66.

Reverse drive requires engagement of reverse clutch (C7) 96, a fluid actuated friction element, which driveably connects input shaft 28 to the inner race 98 of one-way coupling 90, the inner race of over-running coupling 80 and sun gear 46.

Low reverse brake band 100 driveably connects drum 66 to the transmission casing 78 when the brake band is hydraulically actuated. A servo applies band 100 when pressurized hydraulic fluid is applied and releases band 100 when the servo is vented. Inner race 102 of over-running brake 104 is driveably connected to drum 66 continually for rotation therewith. It produces a one-way drive connection between drum 66 and the transmission casing 78 and disconnects drum 66 from the casing 70 in the opposite direction of rotation.

Figure 2:
FIG. 2 is a chart that shows the pattern of engagement and release of the clutches and brakes to establish the various forward drive ratios and reverse ratio for the transmission mechanism of FIG. 1.

FIG. 2 is a chart indicating the clutches and brakes that are engaged or released selectively to produce each of the various forward drive gear ratios and the reverse ratio. In the chart the symbol "X" identifies an engaged friction clutch or friction brake, or an applied one-way clutch or brake, the symbol "O/R" indicates an overrunning condition for a one-way coupling, a blank is used in columns titled "DRIVE" and "COAST" to indicate a one-way coupling that is neither overrunning nor driving, and a blank in the columns entitled "TRANSAXLE FUNCTION ELEMENTS" indicates a disengaged friction clutch or brake.

The gear select lever controlled by the vehicle operator to select the operating range of the transmission is moveable among positions where the various gear ratios are produced automatically and other position where the gear ratios are produced manually. The transmission operates with engine braking when the four lowest gear ratios are selected manually, the drive ranges 1M, 2M, 3M and 4M. Engine braking results in the third speed ratio and fifth speed ratio when the gear ratios are produced by automatic operation of the transmission. There is engine braking also in the reverse gear range.

When the first gear ratio is selected manually the hydraulic control system engages forward clutch 64, low reverse brake band 100, and coast clutch 94. In the drive condition, i.e., when torque is transmitted from the torque converter to the drive wheels of the vehicle, one-way couplings 104 holds ring gear 40 against rotation on the casing through the torque delivery path that includes sun gear 54, coupling 104 and clutch 60. Engine torque drives sun gear 38, ring gear 40 is held stationary; therefore, carrier 42 is driven in the same direction as the engine and the output is taken on output shaft 62. In a coast condition, i.e., when torque is transmitted from the drive wheels to the input shaft, in the 1M range, couplings 70 and 104 do not drive, but coast clutch 94 connects ring gear 40 to the casing through brake drum 66 and band 100.

With the transmission operating in the second speed manual range, 2M, sun gear 46 is held against rotation on the transmission housing through operation of intermediate brake 76 and one-way coupling 80. Sun gear 54, carrier 58 and carrier 50 are mutually driveably connected through engagement of forward clutch 64 and one-way coupling 70. Sun gear 38 is driveably connected to the engine, and carrier 42 of the first planetary gear unit 32 drives the output shaft 62. During a coast condition in the 2-M range, coupling 80 overruns but coupling 90 drives; therefore, sun gear 46 is fixed against rotation on the transmission housing through operation of one-way coupling 90 and overdrive brake 88.

The third gear ratio is a direct drive ratio in which the input shaft 28 and output shaft 62 are directly connected and rotate at the same speed and in the same direction. During a drive condition in the 3-M range, direct clutch 86 connects the input shaft to carrier 50 and sun gear 38 is driven at the speed of the input shaft 28. Forward clutch 64 and coupling 70 driveably connect carrier 58, sun gear 54 and ring gear 40 mutually so that they turn at the same speed and in the same direction as the input shaft and output shaft. The output is taken on carrier 42 and output shaft 62. During a coast condition in the 3-M range, coupling 70 overruns; therefore, coast clutch 94 driveably connects sun gear 54, ring gear 40, carrier 58, and carrier 50 so that they turn in the same direction and at the same speed as the output shaft and input shaft.

The fourth and fifth gear ratios are overdrive ratios. During a drive condition in the 4-M range, sun gear 46 is fixed against rotation on the transmission casing through one-way coupling 90 and overdrive brake 88. Direct clutch 86 connects carrier 50 to the input shaft, and ring gear 48 drives carrier 42 and output shaft 62. During coast conditions in the 4-M range, sun gear 46 is fixed against a rotation on the transmission housing through one-way coupling 80 and intermediate brake 76. Output shaft 62 drives carrier 42 and ring gear 48 and the engine is connected to carrier 50 through direct clutch 86 and input shaft 28.

The following describes operation of the clutch and brake arrangement when gears are selected automatically by the hydraulic control system. When the transmission operates in the first gear ratio, forward clutch 64 and coast clutch 94 are engaged. Ring gear 48 is fixed to the transmission casing against rotation through the torque delivery path that includes sun gear 54, one-way coupling 70, forward clutch 64, drum 66 and one-way brake 104. During coast conditions, the one-way couplings are either overrunning or are inoperative; therefore there is no gear set reaction and no engine braking.

Second gear ratio results by engaging intermediate brake 76 in addition to forward clutch 64 and coast clutch 94. During a drive condition in the second speed ratio, coupling 104 overruns and couplings 70, 80 drive. Sun gear 46 is held against rotation on the transmission casing through operation of coupling 80 and intermediate brake 76. Sun gear 38 of the first planetary gear set 32 is driven by input shaft 28. Sun gear 46 is held and the output is taken on carrier 42 and shaft 60. During a coast condition, couplings 80 and 104 overrun and the other couplings are inoperative; therefore, there is no gearset reaction nor engine braking.

When operating in the third gear ratio in the automatic range, forward clutch 64, direct clutch 86 and intermediate brake 76 are engaged. During the drive condition, couplings 104 and 80 overrun, but coupling 70 drives. The third gear ratio is a direct drive connection between the input and output shafts. Sun gear 38 is directly connected to the input shaft and carrier 50 is connected to the input shaft through engagement of direct clutch 86. Carrier 58 of the third planetary gear set is driveably connected to the third sun gear 54 and to the ring gear 40 of the first planetary gear set through forward clutch 64 and coupling 70. Carrier 58 is also driveably connected to carrier 50. The output is taken at ring gear 48, carrier 42 and output shaft 62. Therefore, two elements of each of the three planetary gear sets turn at the same speed and in the same direction of rotation, thereby completing the direct drive. During a coast condition in the third speed ratio in the automatic range, the same friction elements are engaged, but coupling 70 overruns and coupling 80 drives. Sun gear 46 is fixed against rotation through coupling 80 and intermediate brake 76. Therefore, output shaft 62 drives carrier 42 and ring gear 48, sun gear 46 is held and the connection to the input shaft is from carrier 50 and direct clutch 86. Therefore, engine braking occurs in the third speed ratio in the automatic range.

In the forth speed ratio in the automatic range, forward clutch 64, direct clutch 86 and overdrive brake 88 are engaged. During drive conditions, couplings 104 and 80 overrun, and coupling 90 drives. Sun gear 46 is held against rotation on the transmission casing through operation of coupling 90 and overdrive brake 88. The input shaft drives carrier 50 through direct clutch 86, the corresponding sun gear 46 is held, and the output is taken at ring gear 48, carrier 42 and output shaft 62. During a coast condition couplings 104, 70 and 90 overrun; therefore, there is no drive connection between the output shaft and input shaft and no engine braking.

In the fifth speed ratio in the automatic range, forward clutch 64, direct clutch 86, overdrive brake 88 and high brake 92 are engaged. During a drive condition, couplings 104, 70 and 90 overrun. Carriers 50 and 58 are driveably connected through direct clutch 86 to input shaft 28, and ring gear 56 is held against the rotation by engagement of high brake 92. Therefore, the speed of sun gear 54 and that of ring gear 40, which is driveably connected to sun gear 54, are fixed in relation to input shaft speed. Sun gear 38 rotates at the speed of the input shaft and the output is taken at carrier 42 and shaft 62. In the coast condition, ring gear 56 remains held against rotation by engagement of high brake 92. Carrier 42 is driven and sun gear 38 drives input shaft 20.

When operating in the reverse drive range, brake band 100 and reverse clutch 96 are engaged. Carrier 50 is held against rotation by brake band 100 through the torque deliver path that includes drum 66 and carrier 58. Sun gear 46 is driven at the speed of input shaft 28 due to engagement of reverse clutch 96. The output is taken at ring gear 48, carrier 42 and shaft 62. During a coast condition in the reverse range, ring gear 48 is driven, carrier 50 is held against rotation and sun gear 46 drives input shaft 28 through the reverse clutch; therefore, there is engine braking in the reverse drive range.

Output shaft 62 rotatably supports pinion 110, which meshes with gear 112 carried on shaft 118. A second pair of meshing gears, pinion 114, located at the forward end of shaft 118, and gear 116, supported on shaft 118, driveably connect output shaft 62 to bevel pinion 120 on shaft 118. Pinion 120 drives the spindle 112 of an axle differential mechanism 124, which includes bevel pinions 126, 128 driven by the spindle and side bevel gears 130, 132 meshing with, and driven by the pinions. A first axle shaft 134 is driveably connected to bevel gear 132 through a constant velocity universal joint 136 to a first drive wheel 138. A second axle shaft 140 passes through the crank case 142 located below the engine block 144 to a second constant velocity universal joint 146, from which power is transmitted to the second drive wheel 148.

I claim:

1. A multiple speed ratio automatic transmission for an automative vehicle having a power source for driving a load, comprising:

input means for driveably connecting the power source and a planetary gear system;

output means for driveably connecting the planetary gear system and the load;

a planetary gear system comprising first, second and third planetary gear units, each gear unit having a sun gear, a ring gear, planet pinions meshing with the sun gear and ring gear, and a carrier rotatably supporting the planet pinions, the output means being connected driveably to the ring gear of the second gear unit and to the carrier of the first gear unit, the carrier of the second gear unit being connected driveably to the carrier of the third gear unit, the ring gear of the first gear unit being connected driveably to the sun gear of the third gear unit;

first brake means for holding and releasing the sun gear and carrier of the third gear unit:

first clutch means for driveably connecting and disconnecting the sun gear and carrier of the third gear unit;

second brake means for braking and releasing the ring gear of the third gear unit;

second clutch means for driveably connecting and disconnecting the input means and the carrier of the second gear unit;

third brake means for braking and releasing the sun gear of the second gear unit; and third clutch means for driveably connecting and disconnecting the sun gear of the second gear unit and the input means.

2. The transmission of claim 1 wherein the first brake means comprises:
   a brake drum driveably connected to the carrier of the third gear unit;
   first overrunning coupling means for producing a one-way drive connection between the brake drum and a rotatably fixed surface; and
   brake band means for holding against rotation and releasing the brake drum.

3. The transmission of claim 2 wherein the first clutch means comprises:
   a second overrunning coupling and a first friction clutch disposed in a first series arrangement, said first series arrangement being connected driveably to the brake drum and the sun gear of the third gear unit; and
   a coast clutch connected driveably to the brake drum and the sun gear of the third gear unit.

4. The transmission of claim 1 wherein the second clutch means comprises a second friction clutch located in a torque delivery path between the input means and the carrier of the second gear unit.

5. The transmission of claim 1 wherein the third brake means comprises:
   a third overrunning coupling and a first friction brake arranged in a second series arrangement, said second series arrangement being driveably connected to the sun gear of the second gear unit and a rotatably fixed surface;
   a fourth overrunning coupling and a second friction brake arranged in a third series arrangement, said third series arrangement being driveably connected to the sun gear of the second gear unit and a rotatably fixed surface.

6. The transmission of claim 1 wherein third clutch means comprises a third friction clutch located in a torque delivery path between the input means and the sun gear of the second gear unit.

7. The transmission of claim 1 further comprising:
   a hydrokinetic torque converter having an impeller driveably connected to the power source; and
   a turbine hydrokinetically coupled to the impeller and driveably connected to the input means.

8. The transmission of claim 1 wherein the output means further comprises final drive gearing driveably connecting the output of the planetary gear system and the load.

9. The transmission of claim 1 further comprising:
   a hydrokinetic torque converter having an impeller driveably connected to the power source;
   a turbine hydrokinetically coupled to the impeller and driveably connected to the input means; and
   final drive gearing driveably connecting the output of the planetary gear system and the load.

10. An automatic transmission for an automative vehicle comprising:
    an input shaft and an output shaft disposed parallel to the input shaft;
    a planetary gear system comprising first, second and third planetary gear units, each gear unit having a sun gear, a ring gear, planet pinions meshing with the sun gear and ring gear, and a carrier rotatably supporting the planet pinions, the output means being connected driveably to the ring gear of the second gear unit and to the carrier of the first gear unit, the carrier of the second gear unit being connected driveably to the carrier of the third gear unit, the ring gear of the first gear unit being connected driveably to the sun gear of the third gear unit;
    first brake means for holding and releasing the sun gear and carrier of the third gear unit comprising a brake drum driveably connected to the carrier of the third gear unit, first overrunning coupling means for producing a one-way drive connection between the brake drum and a rotatably fixed surface, and brake band means for holding against rotation and releasing the brake drum;
    first clutch means for driveably connecting and disconnecting the sun gear and carrier of the third gear unit comprising a second overrunning coupling and a first friction clutch arranged in a first series arrangement with the second overrunning coupling, said first series arrangement being driveably connected to the brake drum and the sun gear of the third gear unit;
    second brake means for braking and releasing the ring gear of the third gear unit;
    second clutch means for driveably connecting and disconnecting the input means and the carrier of the second gear unit comprising a second friction clutch located in a torque delivery path between the input means and the carrier of the second gear unit;
    third brake means for braking and releasing the sun gear of the second gear unit comprising a third overrunning coupling and a first friction brake arranged in a second series arrangement with the third overrunning coupling, said second series arrangement being driveably connected to the sun gear of the second gear unit and a rotatably fixed surface, a fourth overrunning coupling and a second friction brake arranged in a third series arrangement with the fourth overrunning coupling, said third series arrangement being driveably connected to the sun gear of the second gear unit and a rotatably fixed surface; and
    third clutch means for driveably connecting and disconnecting the sun gear of the second gear unit and the input means comprising a third friction clutch located in a torque delivery path between the input means and the sun gear of the second gear unit.

11. The transmission of claim 10 further comprising:
    a hydrokinetic torque converter having an impeller driveably connected to the power source; and
    a turbine hydrokinetically coupled to the impeller and driveably connected to the input means.

12. The transmission of claim 10 wherein the output means further comprises final drive gearing driveably connecting the output of the planetary gear system and the load.

13. The transmission of claim 10 further comprising:
    a hydrokinetic torque converter having an impeller driveably connected to the power source;
    a turbine hydrokinetically coupled to the impeller and driveably connected to the input means; and
    final drive gearing driveably connecting the output of the planetary gear system and the load.

* * * * *